United States Patent
Prieto et al.

(10) Patent No.: US 8,851,864 B2
(45) Date of Patent: Oct. 7, 2014

(54) ATTENUATING VIBRATION IN A SUBMERSIBLE PUMP

(75) Inventors: Carlos Prieto, Tulsa, OK (US); Larry Parmeter, Broken Arrow, OK (US)

(73) Assignee: Baker Hughes Incorporated, Houston, TX (US)

(*) Notice: Subject to any disclaimer, the term of this patent is extended or adjusted under 35 U.S.C. 154(b) by 273 days.

(21) Appl. No.: 13/356,990

(22) Filed: Jan. 24, 2012

(65) Prior Publication Data

US 2013/0058797 A1    Mar. 7, 2013

Related U.S. Application Data

(60) Provisional application No. 61/530,608, filed on Sep. 2, 2011.

(51) Int. Cl.
| | |
|---|---|
| *F04B 35/04* | (2006.01) |
| *H02K 7/08* | (2006.01) |
| *E21B 43/12* | (2006.01) |
| *F04D 13/10* | (2006.01) |
| *H02K 7/04* | (2006.01) |
| *H02K 7/16* | (2006.01) |
| *H02K 5/132* | (2006.01) |

(52) U.S. Cl.
CPC ............... *H02K 7/08* (2013.01); *E21B 43/128* (2013.01); *F04D 2205/03* (2013.01); *H02K 2205/03* (2013.01); *H02K 2213/09* (2013.01); *F04D 13/10* (2013.01); *H02K 7/04* (2013.01); *H02K 7/16* (2013.01); *H02K 5/132* (2013.01)
USPC .................................. 417/423.3; 417/423.12

(58) Field of Classification Search
CPC ..... F04D 13/08; F04D 13/086; F04D 25/062; F04D 25/0686; F04D 29/04; F04D 29/041; F04D 29/046; F04D 29/051; F04D 29/056; F04D 29/66; F04D 29/662; F04D 29/669
USPC ...................... 417/423.12; 384/248, 303, 420
See application file for complete search history.

(56) References Cited

U.S. PATENT DOCUMENTS

| | | | |
|---|---|---|---|
| 3,545,301 A | 12/1970 | Richter | |
| 4,669,961 A * | 6/1987 | Lorett | ............................... 418/1 |

(Continued)

FOREIGN PATENT DOCUMENTS

| | | |
|---|---|---|
| EP | 1887125 A1 | 2/2008 |
| GB | 1187326 A | 4/1970 |
| JP | 10-018961 | 1/1998 |

OTHER PUBLICATIONS

Carlos A. Prieto, U.S. Appl. No. 12/909,238, filed Oct. 21, 2010, Tuned Bearing.

*Primary Examiner* — Bryan Lettman
*Assistant Examiner* — Timothy P Solak
(74) *Attorney, Agent, or Firm* — Bracewell & Giuliani LLP

(57) ABSTRACT

Vibration of a rotor positioned within a stator of an electric motor of an electric submersible pump assembly is attenuated in a first embodiment by adjusting the length of the rotor to position rotor bearings supporting the rotor within the stator at locations of low amplitude vibration. In a second embodiment, hydraulic pressure is applied to a fluid chamber supporting a thrust bearing that supports the rotor. When hydraulic fluid pressure is applied, the thrust bearing and the rotor move axially. Thus, moving the rotor bearings away from areas of high amplitude vibration of the rotor. In a third embodiment, a sliding mass affixed to the motor is moved in response to vibration of the motor. Movement of the sliding mass changes the vibration profile of the motor.

2 Claims, 4 Drawing Sheets

(56) References Cited

U.S. PATENT DOCUMENTS

| | | | |
|---|---|---|---|
| 4,873,798 A | 10/1989 | Sato | |
| 4,913,239 A * | 4/1990 | Bayh, III | 166/385 |
| 5,564,537 A | 10/1996 | Shoureshi | |
| 5,571,001 A * | 11/1996 | Fukuda et al. | 417/423.3 |
| 5,595,117 A | 1/1997 | Chrigui | |
| 5,637,938 A | 6/1997 | Vukorpa et al. | |
| 5,794,942 A * | 8/1998 | Vance et al. | 277/303 |
| 6,070,734 A | 6/2000 | Hunt et al. | |
| 6,817,771 B2 | 11/2004 | Campbell | |
| 2003/0192735 A1* | 10/2003 | Yamamoto | 180/444 |
| 2010/0078177 A1* | 4/2010 | Parmeter et al. | 166/369 |
| 2011/0182535 A1 | 7/2011 | Prieto | |

* cited by examiner

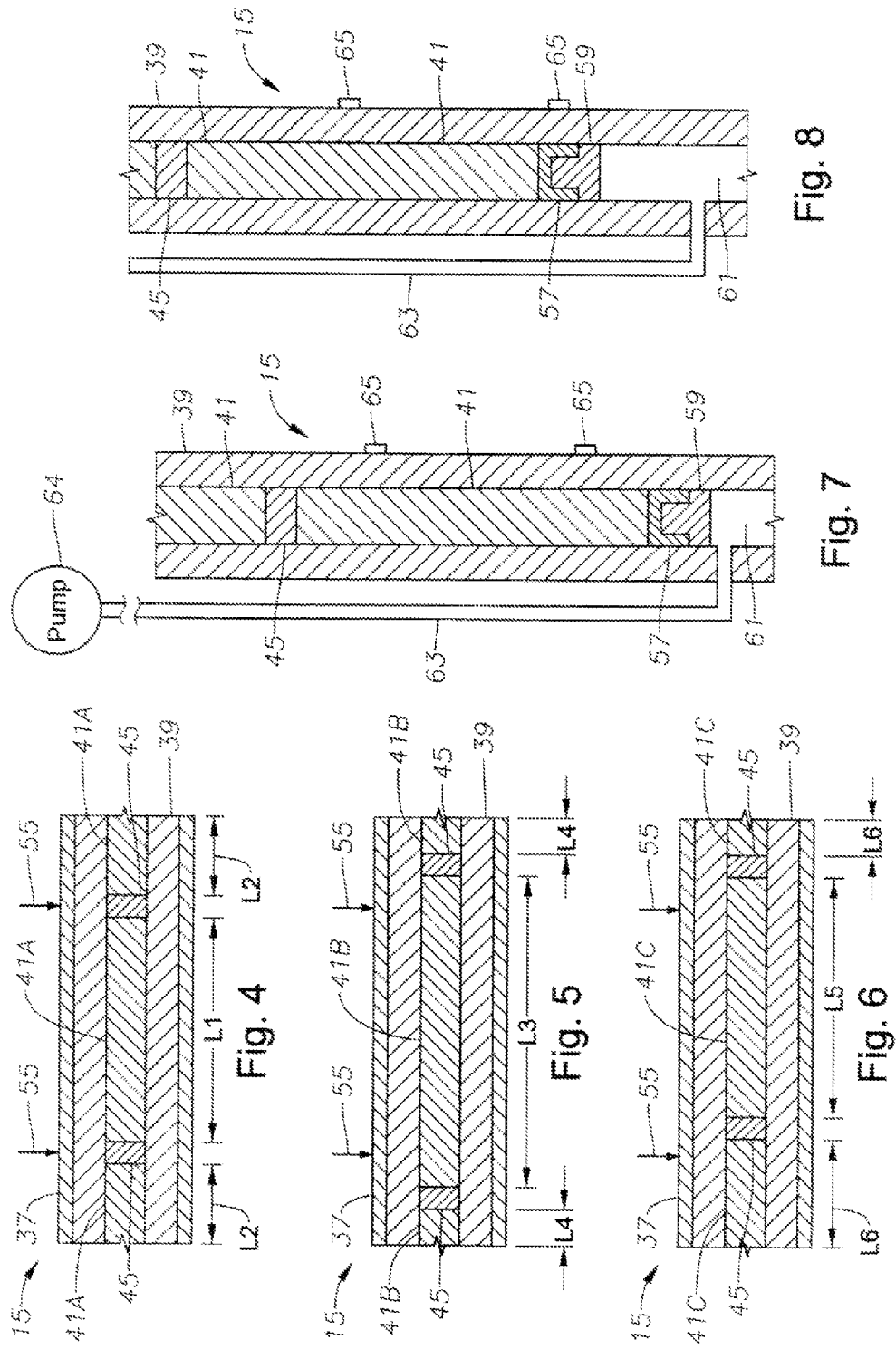

ATTENUATING VIBRATION IN A SUBMERSIBLE PUMP

This application claims priority to and the benefit of U.S. Provisional Application No. 61/530,608, by Prieto et al., filed on Sep. 2, 2011, entitled "SYSTEM AND METHOD FOR ATTENUATION OF ESP MOTOR VIBRATION," which application is incorporated herein by reference.

BACKGROUND OF THE INVENTION

1. Field of the Invention

This invention relates in general to electric submersible pumps (ESPs) and, in particular, to systems, methods, and apparatuses for vibration attenuation within an ESP motor.

2. Brief Description of Related Art

Electric submersible pump (ESP) assemblies are disposed within wellbores and operate immersed in wellbore fluids. ESP assemblies generally include a pump portion and a motor portion. Generally, the motor portion is downhole from the pump portion, and a rotatable shaft connects the motor and the pump. The rotatable shaft may be one or more shafts operationally coupled together. The motor rotates the shaft that, in turn, rotates components within the pump to lift fluid through a production tubing string to the surface. ESP assemblies may also include one or more seal sections coupled to the shaft between the motor and pump. In some embodiments, the seal section connects the motor shaft to the pump intake shaft. Some ESP assemblies include one or more gas separators. The gas separators couple to the shaft at the pump intake and separate gas from the wellbore fluid prior to the entry of the fluid into the pump.

ESP motors generally include a stator and a rotor. The rotor may be positioned within the stator and may rotate on bearings. Generally, an electric current is applied to the stator to generate a rotating magnetic field. The rotating magnetic field induces a current to flow through the rotor that results in toque or rotation of the rotor relative to the stator. Rotors and stators are generally cylindrical objects that are coaxial. The rotor has an outer diameter that is less than the inner diameter of the stator so that there is a gap between the inner diameter of the stator and the outer diameter of the rotor. Thus, rotation of the rotor relative to the stator should not cause contact between the rotor and stator. Rotation occurs on bearings that support the rotor within a cylindrical cavity of the stator. When the rotor rotates relative to the stator, an unbalanced rotor, unbalanced magnetic field creation, oil whirl in the bearings, i.e. where the lubricating oil wedge lifts the rotor out of axial alignment under light loading conditions, or magnetic pull, i.e. where magnetic forces between the rotor and the stator pull the rotor off of balance, may cause the rotor to vibrate during operation. The vibration may occur such that the rotor, or portions of the rotor are no longer coaxial with the stator.

The vibration may have varying amplitudes along the length of the rotor. Higher amplitudes of vibration occurring at the location of the rotor bearings is of particular concern. During operation, when the rotor vibrates relative to the stator, the bearing may pound against the inner diameter of the stator, damaging the insulation of the stator and potentially causing a short. It addition, the components (T-rings) that prevent rotation of the stationary component of the bearing may become damaged and allow the bearing to rotate inside of the stator. This too may damage stator insulation and cause a short. In some cases, the rotor may contact the stator, causing damage to the stator insulation and a short. Still further, if the vibration has a high enough amplitude, the vibration may overcome the loading capacity of the fluid film of the bearing. This will cause wear and erosion of the bearing that will generate heat that may also cause a short in the motor. Therefore, an improved technique for attenuation of motor vibration in an ESP are needed.

SUMMARY OF THE INVENTION

These and other problems are generally solved or circumvented, and technical advantages are generally achieved, by preferred embodiments of the present invention that provide systems, methods, and apparatuses for attenuation of vibration in a motor of an ESP assembly.

In accordance with an embodiment of the present invention, a submersible pump assembly having an electric motor portion and a pump portion is disclosed. The motor comprises a stator disposed within a motor housing, the stator having a central bore with an axis, and a rotor disposed within the central bore of the stator, the rotor coaxial with the stator. At least one rotor bearing radially supports the rotor within the stator. The rotor rotates within the stator on the rotor bearing, and the rotor bearing is located proximate to a vibration node of the rotor.

In accordance with another embodiment of the present invention, a method for attenuating motor vibration in an electric submersible pump assembly is disclosed. The method determines locations of high amplitude vibration along an axial length of a rotor of the motor relative to a stator of the motor. The method determines a location of rotor bearings supporting the rotor within the stator relative to the locations of high amplitude vibration. In the event the rotor bearings are proximate to the locations of high amplitude vibration, the method adjusts a component of the motor to locate the rotor bearings at vibration nodes.

In accordance with yet another embodiment of the present invention, an electric submersible pump assembly is disclosed. The assembly includes a rotary primary pump, and a motor operationally coupled to the primary pump for driving the pump. The motor includes a cylindrical stator defining a cylindrical central cavity having an axis and a rotor having a length. The rotor is positioned within the central cavity of the stator. Rotor bearings are positioned along the length of the rotor within the stator to allow rotation of the rotor relative to the stator. An electric potential is supplied to the stator to cause rotation of the rotor relative to the stator to drive the pump. Rotation of the rotor relative to the stator causes at least one location of high amplitude vibration of the rotor and one vibration node, and the position of the rotor bearings coincides with a vibration node.

An advantage of the disclosed embodiments is that they provide mechanisms to attenuate the impact of vibration within an ESP motor. This will reduce wear of the ESP motor, allowing the motor to operate for longer periods of time. This improves the useful life of the entire ESP assembly, adding significant costs savings to for operators and producers.

BRIEF DESCRIPTION OF THE DRAWINGS

So that the manner in which the features, advantages and objects of the invention, as well as others which will become apparent, are attained, and can be understood in more detail, more particular description of the invention briefly summarized above may be had by reference to the embodiments thereof which are illustrated in the appended drawings that form a part of this specification. It is to be noted, however, that the drawings illustrate only a preferred embodiment of the invention and are therefore not to be considered limiting of its scope as the invention may admit to other equally effective embodiments.

FIG. 4 is a sectional view of the electric motor of FIG. 1.

FIG. 5 is a sectional view of the electric motor of FIG. 4 in accordance with an embodiment.

FIG. 6 is a sectional view of the electric motor of FIG. 4 in accordance with an alternative embodiment.

FIGS. 7-8 are sectional views of the electric motor of FIG. 1 in accordance with an alternative embodiment.

DETAILED DESCRIPTION OF THE PREFERRED EMBODIMENT

The present invention will now be described more fully hereinafter with reference to the accompanying drawings which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout, and the prime notation, if used, indicates similar elements in alternative embodiments.

In the following discussion, numerous specific details are set forth to provide a thorough understanding of the present invention. However, it will be obvious to those skilled in the art that the present invention may be practiced without such specific details. Additionally, for the most part, details concerning ESP operation, construction, and the like have been omitted inasmuch as such details are not considered necessary to obtain a complete understanding of the present invention, and are considered to be within the skills of persons skilled in the relevant art.

Figure 1:
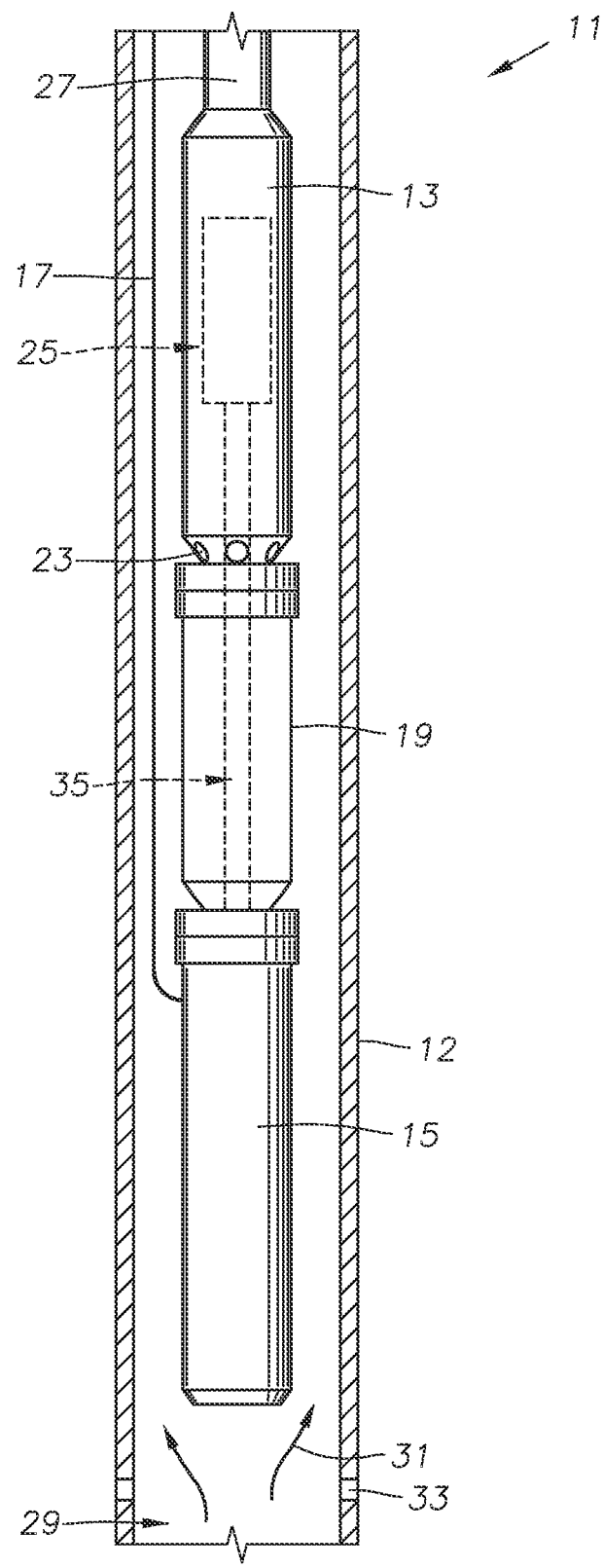
FIG. 1 is schematic view of an electric submersible pump assembly disposed within a wellbore.

With reference now to FIG. 1 an example of an electrical submersible pumping (ESP) system 11 is shown in a side partial sectional view. ESP 11 is disposed in a wellbore 29 that is lined with casing 12. In the embodiment shown, ESP 11 comprises a motor 15, a seal section 19 attached on the upper end of the motor 15, and a pump 13 above seal 19. Fluid inlets 23 shown on the outer housing of pump 13 provide an inlet for wellbore fluid 31 in wellbore 29 to enter into pump section 13. A gas separator (not shown) could be mounted between seal section 19 and pump section 13.

In an example of operation, pump motor 15 is energized via a power cable 17. Motor 15 rotates an attached shaft assembly 35 (shown in dashed outline). Although shaft 35 is illustrated as a single member, it should be pointed out that shaft 35 may comprise multiple shaft segments. Shaft assembly 35 extends from motor 15 through seal section 19 to pump section 13. Impellers 25 (also shown in dashed outline) within pump section 13 are coupled to an upper end of shaft 35 and rotate in response to shaft 35 rotation. Impellers 25 comprise a vertical stack of individual members alternatingly interspaced between static diffusers (not shown). Wellbore fluid 31, which may include liquid hydrocarbon, gas hydrocarbon, and/or water, enters wellbore 29 through perforations 33 formed through casing 12. Wellbore fluid 31 is drawn into pump 13 from inlets 23 and is pressurized as rotating impellers 25 urge wellbore fluid 31 through a helical labyrinth upward through pump 13. The pressurized fluid is directed to the surface via production tubing 27 attached to the upper end of pump 13.

Figure 2:
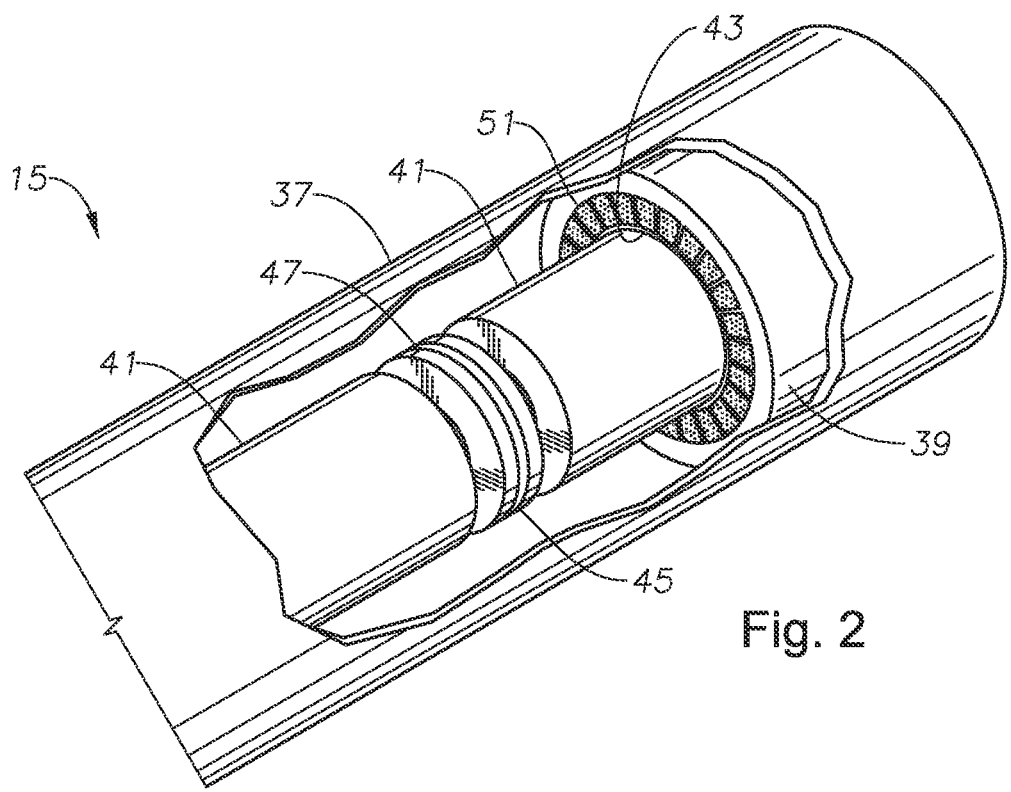
FIG. 2 is a partial cutaway view of a portion of an electric motor of the electric submersible pump assembly of FIG. 1.
Figure 3:
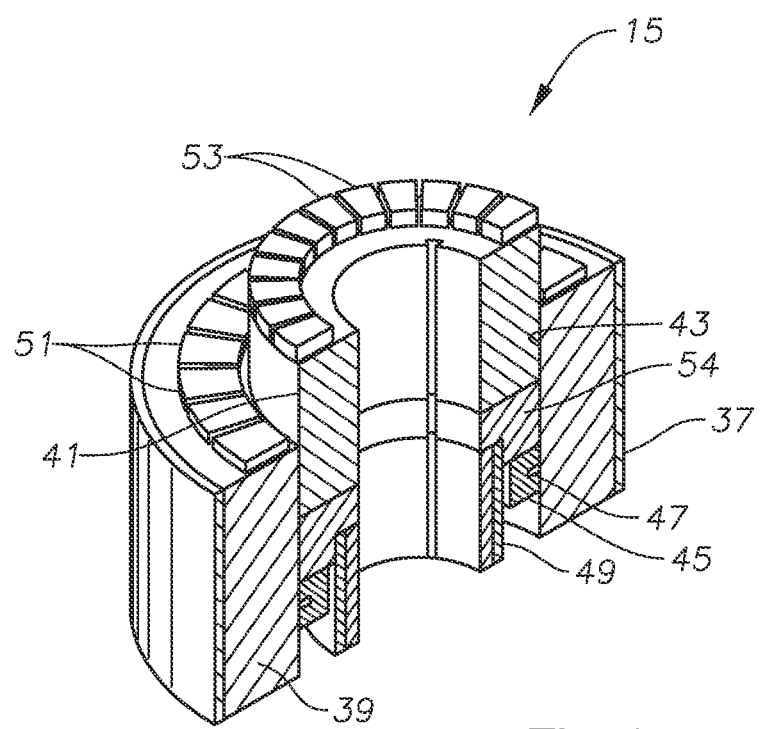
FIG. 3 is a partial sectional view of a portion of the electric motor of FIG. 2.

Referring to FIG. 2 and FIG. 3, motor 15 includes a housing 37, a stator 39, and a rotor 41. Stator 39 is a cylindrical member defining a cylindrical cavity 43. Rotor 41 is assembled within cylindrical cavity 43. Rotor 41 may have an outer diameter that is smaller than the inner diameter of cylindrical cavity 43 such that an air gap exists between rotor 41 and stator 39. Rotor 41 may be supported within cylindrical cavity 43 by bearings 45. Bearings 45 may be any suitable bearing type. In the illustrated embodiment bearings 45 comprise a stationary member 47 in non-rotating contact with stator 39, and a rotating member or members 49 secured to rotor 41 using a key secured in a keyway (not shown) in rotor 41. A fluid film will form between rotating member 49 and stationary member 47 when rotor 41 rotates relative to stator 39. As illustrated, rotor 41 may have multiple segments having bearings 45 interposed between the segments.

In the illustrated embodiment, three separate coils of wire or windings 51, each coil associated with a separate phase of a three phase power source, such as cable 17 (FIG. 1), are distributed uniformly around the inner circumference of steel laminations that form stator 39. A person skilled in the art will understand that stator 39 may have more or fewer coils associated with a separate phase as needed for the particular application. An encapsulate may surround windings 51 and support windings 51 within stator 39. A plurality of conductors 53 are formed near an outer diameter surface of rotor 41 and extend lengthwise along rotor 41. Each conductor 53 is parallel to adjacent conductors 53 and is shorted by electrical shorting rings 54. Windings 51 are connected to an alternating three phase voltage source that causes current in stator 39 to produce a rotating magnetic field in the air-gap between stator 39 and rotor 41. The rotating magnetic field induces a three-phase current in conductors 53 that, in turn, results in a torque delivered to rotor 41 and rotation of rotor 41 as is commonly understood in the art.

As rotor 41 rotates relative to the stator 39, an unbalanced rotor 41, unbalanced magnetic field creation, oil whirl in bearings 45, i.e. where the lubricating oil wedge lifts rotor 41 out of axial alignment under light loading conditions, or magnetic pull, i.e. where magnetic forces between rotor 41 and stator 39 pull rotor 41 out of balance, may cause rotor 41 to vibrate during operation. Vibration may occur in different vibration modes. Each vibration mode will have an area of higher amplitude vibration and a vibration node, or area of lower amplitude vibration. As used herein, vibration amplitude refers generally to the size of the movement of rotor 41 from its equilibrium position. Thus, a vibration node is an area where the amplitude of vibration is lower or close to a zero value. Areas of higher amplitude vibration are areas where the amplitude of rotor vibration is at some value greater than the amplitude of vibration at a vibration node, up to a maximum vibration amplitude that may occur when rotor 41 vibrates at a resonant frequency. As used herein, a vibration node will have a vibration amplitude that is less than 50% of the maximum vibration amplitude for the system. Areas of higher vibration may have a vibration amplitude that is greater than 50% of the maximum vibration amplitude for the system.

Referring now to FIGS. 4-6, examples of an embodiment for handling vibration within motor 15 are illustrated. Vibration of motor 15 may be modeled based on the air-gap between rotor 41 and stator 39, the tolerance of bearings 45, the viscosity of the lubricating fluid in the air gap and bearings 45, the operating temperature of motor 15, expected unbalance of rotor 41, and the like. In addition, motor 15 may be constructed and tested to determine areas high amplitude vibration of motor 15. In response, a length of rotor 41 may be varied so that bearings 45 are located at vibration nodes, i.e. where the vibration amplitude is less than 50% of the maximum vibration amplitude for the system. Referring to FIG. 4 high amplitude areas of vibration may occur at locations 55. Rotors 41A may have a length L1 and L2 as shown, locating bearings 45 at locations 55. To prevent location of bearings 45 at locations 55 of high amplitude vibration, the length of rotor 41 may be adjusted as shown in FIG. 5. In FIG. 5, rotor 41B may have a length L3 and L4. Bearings 45 may be positioned between segments of rotor 41B at the end of lengths L3 and L4. This locates bearings 45 away from locations 55 of high amplitude vibration, reducing the risk of damage caused by vibration of rotor 41 relative to stator 39. In an alternative embodiment, illustrated in FIG. 6, rotor 41C may have a length L5 and L6. Bearings 45 may be positioned between segments of rotor 41C at the end of lengths L5 and L6. This locates bearings 45 away from locations 55 of high amplitude vibration, reducing risk of damage due to vibration of rotor 41 relative to stator 39. A person skilled in the art will understand that L3, L4, L5, and L6 may be any suitable length such that bearings 45 are not sited at locations 55 of high amplitude vibration. Rotors 41A, 41B, and 41C may have varying lengths or may all be equivalent lengths. Still further, rotors 41A, 41B, and 41C may comprise any suitable number of segments of rotor 41 having lengths L3, L4, L5, and L6 as needed for the application of motor 15.

Referring to FIGS. 7 and 8 an alternative embodiment for attenuation of vibration in motor 15 is illustrated. Rotor 41 of motor 15 is supported radially by bearings 45 as illustrated in FIG. 1-6. In the embodiment of FIG. 7 and FIG. 8, rotor 41 is supported axially on a thrust assembly comprised of a thrust runner 57 and a thrust bearing 59. Rotor 41 is coupled to thrust runner 57. Thrust runner 57 rotates with rotation of rotor 41 on thrust bearing 59. Thrust bearing 59 provides axial support to rotor 41. Thrust bearing 59 is a piston, which, in turn, is supported by fluid in a pressure chamber 61. Pressure chamber 61 is supplied with hydraulic fluid from a pressure source 64, such as a pump, through a capillary tube 63 that extends alongside motor 15. Capillary tube 63 may be supplied with hydraulic fluid in any suitable manner, such as with a hydraulic umbilical extending to the surface, from a hydraulic support module located within the wellbore proximate to motor 15, or the like. In another embodiment, capillary tube 63 may be supplied with hydraulic fluid from a downhole assembly or an assembly contained within motor 15. Sensors 65 may be located on motor 15 and more specifically rotor 41. In the illustrated embodiment, sensors 65 comprise vibration sensors adapted to locate areas of high vibration of motor 15. During operation of motor 15, vibration sensors 65 may be monitored, such as by an operator located at the surface, a wellbore control system, or the like. When unacceptable levels of vibration of motor 15 or rotor 41 are detected, hydraulic pressure may be supplied to pressure chamber 61 through capillary tube 63. The increase in hydraulic pressure will exert an axial force on thrust bearing 59 causing thrust bearing 59 to move axially in response to the increased pressure in pressure chamber 61. In response, thrust runner 57 and rotor 41 supported on thrust runner 57 will move axially. As shown in FIG. 8, this axial movement may be in an upward or first direction. A person skilled in the art will understand that a negative hydraulic pressure may be supplied through capillary tube 63. In response, thrust bearing 59, thrust runner 57, and rotor 41 may move axially in a downward or second direction opposite the first direction. Axial movement of rotor 41 may change the vibrational dynamic of motor 15, reducing vibration. In addition, moving rotor 41 axially may move bearings 45 away from areas of high amplitude vibration to vibration nodes.

Figure 10:
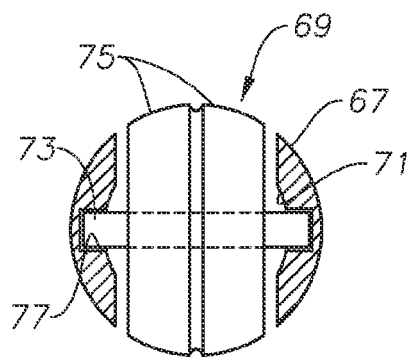
FIGS. 9-11 are sectional views of a housing extension and sliding mass component in accordance with an alternative embodiment.
Figure 9:
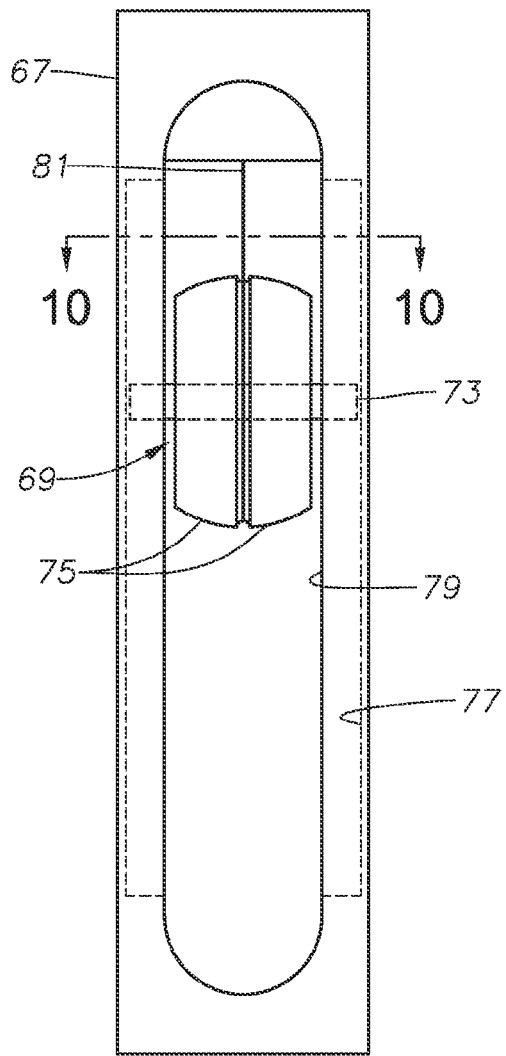
Figure 11:
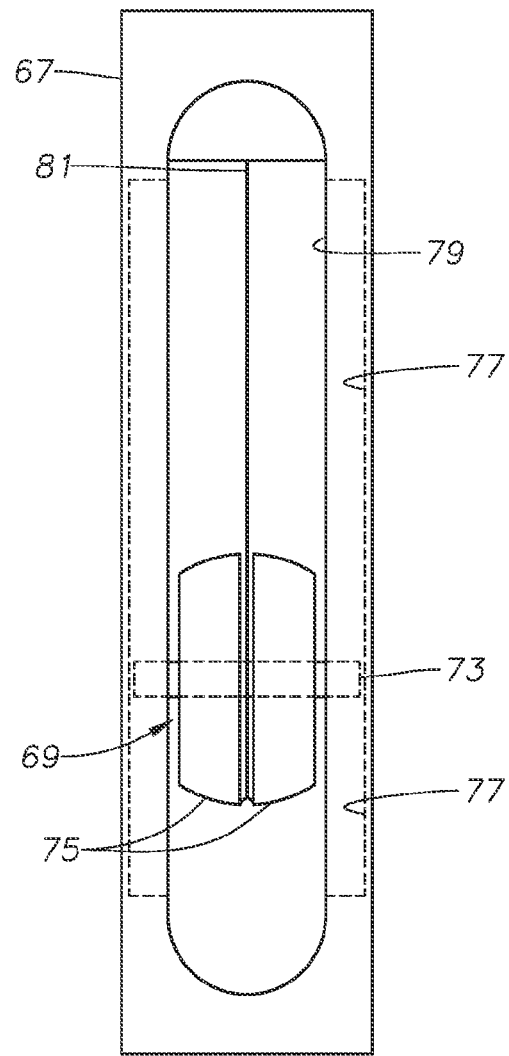

Referring to FIGS. 9-11, an alternative embodiment for attenuation of vibration in motor 15 is illustrated. Housing 37 (FIG. 2) includes a housing extension 67. Housing extension 67 may extend from a lower end of motor 15 and have a cage like structure. A person skilled in the art will understand that housing extension 67 may secure to other areas or portions of motor 15. A sliding mass 69 is supported within a cavity 71 of housing extension 67. Sliding mass 69 includes an axle 73 and at least one weighted disc 75, two of which are used in the embodiments of FIG. 9-11. Ends of axle 73 fit within slots 77 formed in opposing walls of cavity 71. A channel 79 may be formed in housing extension 67, into which weighted discs 75 may fit. In the illustrated embodiment, channel 79 passes entirely through housing extension 67, and a plane encompassing channel 79 is perpendicular to a plane encompassing slots 77. In the illustrate embodiment, wellbore fluid may flow through housing extension 67 via channel 79. A wire 81 extends from the surface to sliding mass 69 and allows for controllable movement of sliding mass 69 by any suitable means. In an embodiment, wire 81 is fixed near an upper end of channel 79, allowing an opposite end of wire 81 extending into channel 79 to move. This, in turn, will cause sliding mass 69 to move axially as illustrated in FIG. 11. Wire 81 may be coupled to an electric motor located at the surface such that a user may manually change the position of sliding mass 69 by winding or unwinding wire 81 at the surface. In alternative embodiments, wire 81 may be wound or unwound in response to a control mechanism receiving vibration input from the motor and communicatively coupled to the motor located at the surface to operate the motor. Movement of sliding mass 69 may in turn cause a change in the vibrational dynamic of motor 15 (FIG. 1), reducing the impact of vibration in motor 15. By changing the vibrational dynamic of motor 15, the location of vibration nodes of rotor 41 may be moved to the location of bearings 45.

Accordingly, the disclosed embodiments provide numerous advantages. For example, the disclosed embodiments provide mechanisms to attenuate the impact of vibration within an ESP motor. This will reduce the wear on the motor of the ESP, allowing the motor to operate for longer periods of time. This improves the useful life of the entire ESP assembly, adding significant costs savings for operators and producers.

It is understood that the present invention may take many forms and embodiments. Accordingly, several variations may be made in the foregoing without departing from the spirit or scope of the invention. Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

What is claimed is:

1. An electric submersible pump assembly comprising:
a rotary primary pump;
a motor operationally coupled to the primary pump for driving the pump;
a cylindrical stator defining a cylindrical central cavity having an axis, the stator positioned within the motor;
a rotor having a length and positioned within the central cavity of the stator;
rotor radial bearings positioned along the length of the rotor within the stator to allow rotation of the rotor relative to the stator;
wherein rotation of the rotor relative to the stator causes at least one location of high amplitude vibration of the rotor;
a thrust bearing comprising a piston positioned to axially support the rotor;
a hydraulic pressure chamber positioned axially adjacent the piston so that the piston is axially supported by pressure within the pressure chamber;
a capillary tube communicatively coupled to the pressure chamber and extending alongside and upward from the motor; and
a hydraulic pressure pump located above the motor and connected to the capillary tube for supplying hydraulic pressure to the pressure chamber in an adjustable amount to adjust an axial position of the rotor and the rotor radial bearings such that none of the radial bearing are located at the location of high amplitude vibration.

2. The submersible pump assembly of claim 1, wherein said at least one location of high rotor vibration comprises a location where the amplitude of rotor vibration is greater than 50% of the maximum resonant rotor vibration.

* * * * *